UNITED STATES PATENT OFFICE.

ELIZABETH BARNSTON PARNELL, OF SYDNEY, NEW SOUTH WALES.

PROCESS OF TREATING CERTAIN DESCRIPTIONS OF AURIFEROUS AND ARGENTIFEROUS MATERIAL, &c.

SPECIFICATION forming part of Letters Patent No. 360,904, dated April 12, 1887.

Application filed March 11, 1886. Serial No. 194,863. (No specimens.)

*To all whom it may concern:*

Be it known that I, ELIZABETH BARNSTON PARNELL, a subject of the Queen of Great Britain, residing at Sydney, in the British Colony of New South Wales, have invented an improved process of treating certain descriptions of auriferous and argentiferous material for the purpose of facilitating the separation of the metals contained therein; and I do hereby declare that the following is a full, clear, and exact description of the invention, which will enable others skilled in the art to which it appertains to make and use the same.

This invention has been designed for the purpose of treating those kinds of auriferous and argentiferous material which contain sulphur, arsenic, antimony, or other base metals, and its object is to drive off or separate said sulphur and base metal, so as to leave the gold (mixed with such portion of the silver as has not been converted into a soluble sulphate) "free," and thus facilitate its extraction.

My process is to crush the material to a powder, then to subject it to a low but gradually-increasing heat, and finally to boil it. I crush the material to a powder in order to increase its surface area, and so allow the heat to reach every part of it more readily, and thus reduce the period of calcination. I heat it gradually, so as to drive off the volatile oxides and leave the metals in the state of soluble sulphates. In practice I find it impossible to effect these results at one calcination or roasting, and so I adopt two. The first takes, say, from four to six hours, and the heat should not exceed, say, from 1,100° to 1,300° Fahrenheit. When this is completed I draw the charge, and after it is cool I regrind it, for it is of great importance to reduce the material to the finest atoms possible. I then recalcine or roast it at a much higher heat than before say from 1,200° to 1,600° Fahrenheit—sufficient, if employed in the first roasting, to have run it into a matte. I continue this roasting until all the volatile oxides have been driven off and until all the metals which it is possible to make into soluble sulphates have been reduced to that condition. This effect is usually produced in from five to six hours. The time occupied in this part of the process may be greatly reduced by supplying oxygen (artificially produced) along with the air. It is almost impossible to say how much should be thus supplied, because the quantity would alter with the material under treatment; but I have found that with some material the period of furnacing may be lessened to about one-fourth of that stated herein—that is to say, it may be reduced from periods of eight or twelve hours to periods of two or three hours.

The crushed and calcined (or roasted) material I place in a wooden vessel, add hot water to it, and boil for from fifteen to twenty minutes, the object being to dissolve the soluble sulphates. This, however, is usually not effected at one boiling, but requires two or three. These must be in quick succession, so as not to allow the material to cool, and the water must not be allowed to descend below boiling-point. The boiling is complete when a test does not show the presence of copper. The crushed, dried, and boiled material is now ready for any further treatment for the extraction of its gold, which will be in a free condition, although it may possibly be mixed with a small portion of unconverted sulphide of silver. This free gold can be extracted by amalgamation, chlorination, or any other approved process, my invention terminating when the precious metal is free. The "soluble sulphate" solution may be conducted into suitable vats and its sulphates precipitated by any of the known processes.

The result of the roasting part of my process is to convert the sulphide of iron into peroxide of iron, and the sulphides of silver, copper, nickel, manganese, and cobalt into soluble sulphates. The galena is converted into sulphate of lead, which is insoluble, while the arsenic, antimony, and a portion of the sulphur volatilize. It is very necessary that great care should be exercised in conducting this part of the process, because if the heat be too low undecomposed sulphides will remain, and if it be too high insoluble oxides will be formed instead of soluble sulphates.

I am aware that it is not new to subject ores to gradually-increasing temperatures in the presence of gradually-increasing volumes of air in the process of roasting for the purpose of changing the texture of the rock without running it into a matte to convert the base metals into oxides; nor is it new to leach out in a cold or warm bath or in an acid bath the soluble salts formed by roasting, or to roast ores in the presence of oxygen; and I do not desire to claim either of these, broadly.

What I claim, therefore, is—

1. The herein-described process of treating those auriferous and argentiferous minerals or ores that contain sulphur, arsenic, antimony, or other base metals, which consists in reducing the ore to a powder, roasting the same under gradually-increasing temperatures without running them into a matte, cooling the ores, regrinding and reroasting the same under gradually-increasing and higher temperatures without running the charge into a matte, and leaching out the soluble sulphates formed in the process of roasting by repeated boiling of the roasted ore in water without allowing the bath to fall below the boiling-point, substantially as and for the purpose specified.

2. The herein-described process of treating those auriferous and argentiferous minerals or ores that contain sulphur, arsenic, antimony, or other base metals, which consists in reducing the ore to a powder, roasting the same under gradually-increasing temperatures without running them into a matte, cooling the ores, regrinding and reroasting the same under gradually-increasing and higher temperatures, the roasting being effected in the presence of oxygen, in addition to the atmospheric air, and without running the charge into a matte, and leaching out the soluble sulphates formed in the process of roasting by repeated boiling of the roasted ore in water without allowing the bath to fall below the boiling-point, substantially as and for the purpose specified.

ELIZABETH BARNSTON PARNELL.

Witnesses:
GEORGE MIDDLETON,
ERNEST C. DAVIES.